Aug. 5, 1969  A. VACCARO  3,460,143
APPARATUS FOR MEASURING THE QUALITY OF A PRINTED CHARACTER
Filed Sept. 18, 1967  2 Sheets-Sheet 1
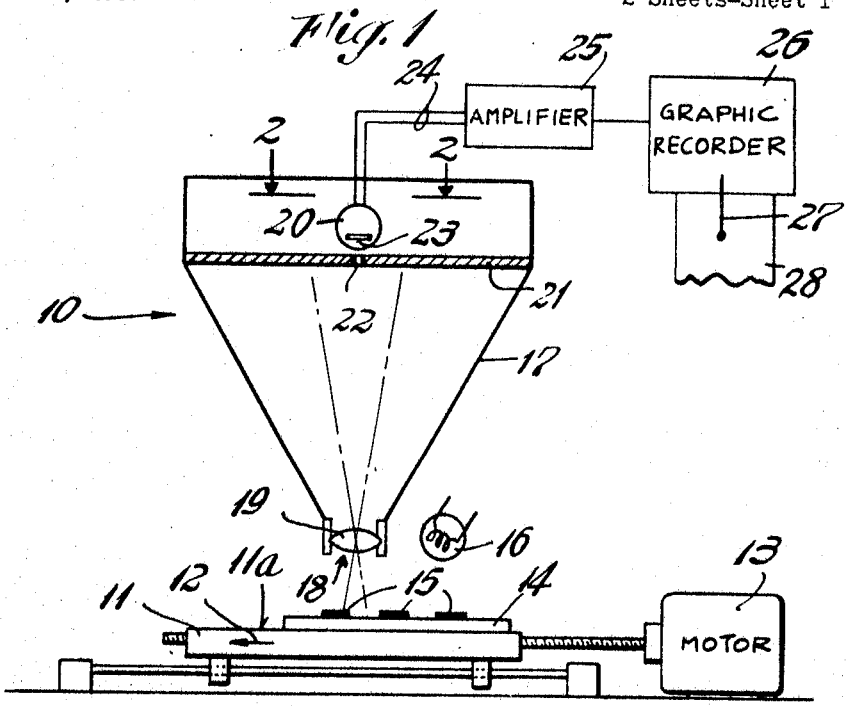
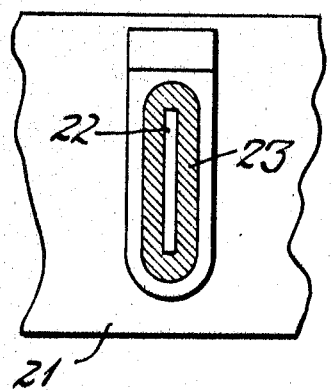
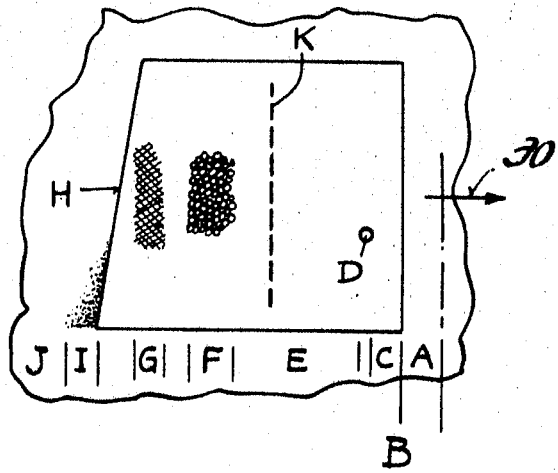
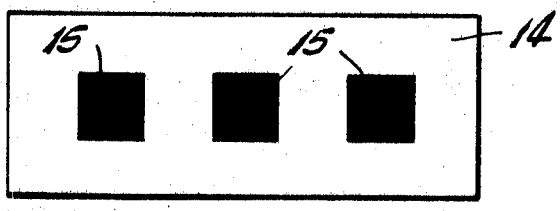
INVENTOR.
Angelo Vaccaro
BY
Johnson and Kline
ATTORNEYS

United States Patent Office 3,460,143
Patented Aug. 5, 1969

3,460,143
APPARATUS FOR MEASURING THE QUALITY OF A PRINTED CHARACTER
Angelo Vaccaro, Port Washington, N.Y., assignor to Columbia Controls Research Corporation, Glen Cove, N.Y., a corporation of New York
Filed Sept. 18, 1967, Ser. No. 668,322
Int. Cl. G01d 9/00
U.S. Cl. 346—33       3 Claims

ABSTRACT OF THE DISCLOSURE

An apparatus for optically scanning a printed character to determine its quality by changes in the reflectance of light therefrom by moving the character past a sensing station that is only responsive to a small transverse width of the character but substantially the height of the character to thereby scan essentially the whole character and provide a record of the reflectance.

---

In many situations it has been desirable to determine the quality of a medium for effecting the formation of a printed character. While this may be done by testing the medium, a preferred manner is to test the results of the medium, said results being the typed character where the medium for example is carbon paper, typewriter ribbon or other ink transferring mediums. When the printing is accomplished by a hammer having the shape of the character being struck against the printing medium and a copy sheet, the force of the blow is of importance as is the quality of the copy paper on which the character is printed or formed. Standard tests for forming the printed character have included specifications for the force of the hammer blow and type of copy sheet. Moreover, the character rather than being a recognizable letter or symbol is generally square or rectangular in shape to correspond to the maximum area on the copy sheet within which the letters and characters may be placed. The copy sheet having the printed character is then placed under illumination, a photocell measures the reflectance of the light reflected from the character and the value of the photocell caused by changes with reflectance is noted to provide an indication of the quality of the character made.

In this heretofore method of testing, the photocell is made responsive to a circular area that is somewhat less than the area of the square character. The photocell is supposed to be moved with the boundary of the character and readings are taken of the change in condition of the photocell caused by reflectance changes. The readings may be at random or be just maximum and minimum readings. While this method has been found to provide somewhat of an indication of the quality of the character and hence of the printing medium, it has not been found to be completely satisfactory. One defect has been its lack of preciseness. It will be understood for example that a void, i.e., absence of ink in a small spot, while constituting a substantial part of the circular area sensed by the photocell may be of relatively minor importance in the whole character and hence introduce distortion into interpreting the quality of the medium. Moreover, such a method of testing does not measure many other characteristics of the printing character which may be of importance, said characteristics including the roughness or jaggedness of the edges, the quality of the character substantially throughout its whole dimensions, smudging of the copy paper outside of the character, the shape of the character with respect to undesirable enlargement, etc.

It is accordingly an object of the present invention to provide an apparatus for precisely measuring many characteristics of a printed character.

Another object of the present invention is to achieve the above object with an apparatus that is not only extremely simple in construction and reliable in use but which may be operated by relatively unskilled users.

A further object of the present invention is to provide an apparatus for measuring the quality of a printed character by producing a graphic record of the character from which the quality thereof may be easily ascertained and thus enable a determination of the quality of a printing medium from which the character was formed.

In carrying out the present invention, as hereinafter disclosed, the printing medium is a typewriter ribbon and the character is formed according to standardized procedures wherein the force of the typewriter key and the specifications of the copy paper are known and repeatable. The character while it may be of many shapes herein is specifically a square having boundaries within which most characters of the typewriter can be contained. One or more of the characters is formed on the copy sheet with the spacing therebetween being the usual typewriter spacing. The copy paper is then secured on a flat support forming part of the apparatus.

The support is caused to move transversely, i.e., along the typed line of characters, at a predetermined rate and a light source provides illumination thereupon. Positioned slightly above the support is an opaque container having an opening in which a magnifying lens is positioned and spaced upwardly from the lens, i.e., perpendicularly to the plane surface of the support, is a photomultiplier tube. The tube responds to the amount of light impinging thereon by changing one of its conditions, such as its resistance at a known relationship with the quantity of light. The output of the photomultiplier tube is then amplified and used as an input signal to a graphic recorder.

The character is moved beneath the lens in a manner which provides a magnified image of the character that is focused on the responsive area of the photomultiplier tube. Between the responsive area of the tube and the lens is positioned an opaque screen having a rectangular slit that is aligned with the responsive area. The only light thus impinging on the responsive area accordingly must be that which passes through the slit. In this manner as the support moves the character beneath the lens, a continually different small portion of the character will be reflected on the responsive area and its reflectance, as determined by a change in the condition of the tube will provide a signal that is recorded by the strip-chart graphic recorder.

More particularly, the lens serves to make the image many times larger than the character, i.e., for example eight times and the slit has only a small transverse width such as .010 but a length which is essentially the height of the image of the character. Accordingly only an extremely small vertical section of the character is "seen" by the photomultiplier tube at a time. As the character is moved beneath the lens, the vertical section thus seen continuously changes and the amount of reflectance of this section is measured and recorded. From the recording, the quality of the character may be easily ascertained and hence that of the printing medium.

In the drawing:

FIGURE 1 is a diagrammatic representation of the apparatus of the present invention.

FIG. 2 is a section taken on the line 2—2 of FIG. 1 showing the relationship between the photomultiplier tube and the screen containing the slit.

FIG. 3 is a view of a plurality of characters formed on copy paper, somewhat enlarged.

FIG. 4 is an enlarged view of a character.

Figure 5:
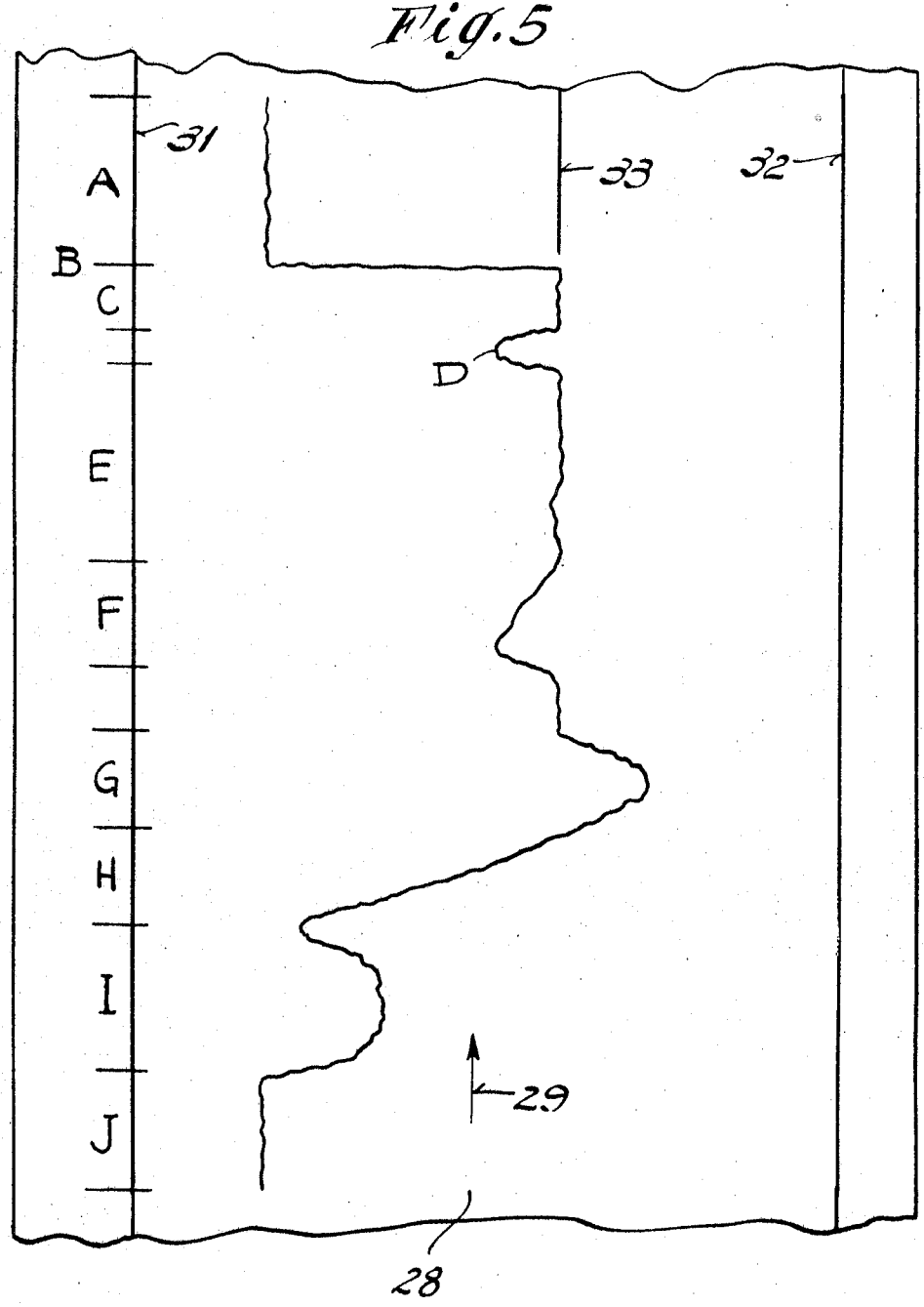
FIG. 5 is a graphic recording of the character of FIG. 4 as produced by the apparatus of the present invention and from which the quality of the character and printing medium may be ascertained.

Referring to the drawing the apparatus of the present invention is generally indicated by the reference numeral 10 and includes a support 11 movable in the direction of the arrow 12 by a motor means 13. The support has a planar surface 11a and is mounted in any convenient manner, such as on rods to be movable linearly only in the direction of the arrow with the surface 11a being maintained in a flat plane. The motor means may be a rotary electric motor operating through a rotary to linear translator to provide the force to move the support 11 in the direction indicated preferably at a set rate with one rate being ⅛ of an inch in 30 seconds.

Fastened flat onto the planar surface 11a of the support as by adhesive means, such as tape (not shown), is a copy sheet 14 of paper having three characters 15 formed thereon. The characters consist merely of a solid rectangular ink impression as shown in FIG. 3 and each may be formed according to a standardized procedure. When testing a typewriter ribbon for example, the procedure consists of striking the ribbon against a specific copy sheet 14 with a predetermined force with a character being formed by each stroke and separated by a space from the other character. In FIG. 1, the copy sheet 14 and the characters 15 are shown distorted in thickness for clarity of illustration.

A light source 16 which may be simply an electric bulb is continuously energized and fixed to direct light onto the copy sheet 14. Positioned above the copy sheet and support 11 is a closed opaque container 17 having an opening 18 in which is secured a lens 19 so that the only light into the container is through the lens 19. Upwardly of the lens in the container, there is mounted a photomultiplier tube 20 while positioned between the lens and the tube is an opaque screen 21 having a slit 22.

The lens 19 is selected and so positioned with respect to the photomultiplier tube that it creates a magnified image on a responsive area 23 of the tube of the portion of the copy sheet beneath the lens with the image being focused in a plane that contains the area 23. The slit 22 is positioned closely adjacent the responsive area 23 in alignment with it and the lens and serves to limit the portion of the image that is received by the tube 20 to only that which passes through it.

The photomultiplier tube is of conventional construction in that it changes one of its conditions, such as its resistance, in a known relationship to the total amount of light received by its responsive area 23. The output of the tube 20 consisting of a variable electrical signal appears on a pair of leads 24 that are connected to an amplifier circuit 25. The amplifier amplifies the signal in the leads 24 and applies it to a graphic recorder 26 which may be of any known construction. The recorder has a moving pen 27 which is moved transversely across a strip of paper 28 in response to the value of a signal received thereby and the paper is continuously moved at at a predetermined rate so that a graph of the signal is produced.

In FIG. 2 there is shown a detail of construction taken on the line 2—2 of FIG. 1 of the photomultiplier tube and the screen 21. The responsive area of the tube is indicated by the sectioned area 23 and is larger in all dimensions than the slit 22. Accordingly, all light passing through the slit impinges on the area to effect its condition. Moreover, the slit is closely located near the responsive area to more accurately control the size of the section of the character which impinges on the area.

With the apparatus as above described, the lens 19 serves to create an image at the responsive area 23 that is magnified. If, considering as for example, that the length of the responsive area is slightly more than one inch and the height of the character 15 is ⅛ of an inch, then the image is preferably enlarged about eight times. The width of the slit 22 is preferably made to cause the tube to sense a section that is about 1% of the width of the character 15 and thus may be on the order of .0100 of an inch if the character is ⅛ of an inch in width and magnified eight times. Though, naturally if desired and depending upon other factors, such as the responsiveness of the tube, the slit may be increased or decreased in width to adjust the percentage of the character being sensed. The maximum percentage, however, in order to obtain an acceptable preciseness is believed to be about 5% of the width of the character being sensed.

While the length of the slit 22 could be such as to enable the full transverse height of the section of the character image to impinge upon the responsive area, it has been found desirable to decrease this length to somewhat less than the complete height of the character. In this way, absolute alignment between the character and the slit is obviated but yet substantially all of the character is sensed. It will be understood that if for example misalignment occurs between the character and the slit, if the slit was of the length to admit all of the height of the character image to the photomultiplier tube, that some misalignment could cause the phototube to sense a portion of the copy paper outside of the character thereby introducing error into the reading. One specific embodiment that has been found satisfactory is to have the slit limit the height of the portion of the character to approximately ¾ of the total height.

In using the apparatus, the copy paper 14 bearing the characters 15 is fastened onto the support 11 and the graphic recorder and motor means are energized. Both the support and the graph paper on the recorder will accordingly begin movement. If a character, such as an enlarged character shown in FIG. 4, is passed beneath the lens, the apparatus will produce a graph of it as shown in FIG. 5. The graph paper 28 of the graphic recorder moves upward as indicated by the arrow 29 (FIG. 5) while the character is moved in the direction indicated by the arrow 30 (FIG. 4). A vertical line 31 is near one edge of the paper and corresponds to the whitest extreme signal from the phototube while the line 32 is the black extreme thereof. Thus as the phototube senses the portion denoted A in FIG. 4, which is the reflectance of the copy sheet, the portion A on the graph will be produced. It is of somewhat less reflectance than the whitest extreme signal which the tube will produce and hence is located rightwardly of the line 31.

Upon the edge of the character at the line B being sensed by the responsive area of the tube, the recorder will produce the substantially horizontally extending line on the graph opposite the reference character B (FIG. 5). This graph line will tilt slightly downwardly even with a perfect character as shown in view of the lag in the recorder and the relative gradual increasing of the total area being sensed from greater to lesser reflectance. The portion with the space denoted by the letter C of the character is substantially free of defects and of constant reflectance and thus only a small wiggling line opposite the letter C is produced on the graph. This portion of the graph is essentially aligned with a vertical reference line 33 which may be used to indicate an acceptable quality of darkness of the character.

With the character continuing to pass beneath the lens a void D is read which causes the graph to have a leftwardly extending depression indicated by D in FIG. 5 denoting the increase of reflectance caused by the void, a small area having little or no ink. Continued movement of the character to read the portion E thereof will produce a length E on the graph which is generally centered about the average line 33 until an area indicated by closed loop lines F is sensed. The area F is a light area that is not as dark as the rest of the character, and depending upon its shape, it will cause a leftwardly extending depression aligned with the horizontal letter F on the graph. Conversely if the next area indicated by the crosshatched lines G is an extra dark area, the graph will hump rightwardly as shown opposite the horizontal width G on the graph.

The end of the character is shown in FIG. 4, as having a tilted edge H which causes when it is read, to have the graph line be steeply inclined as shown opposite the horizontal area H. Moreover, if smudging should occur as indicated by the dotted area I, there will occur a rightwardly extending hump such as shown on the graph opposite the horizontal area I prior to the photomultiplier tube sensing the copy sheet indicated by the portion J in both FIGS. 4 and 5. This portion of the graph is substantially aligned with the portion A indicating it has about the same reflectance which it should have.

After a graph has been made of one or more characters, a user can easily identify if the character is of acceptable darkness by reference to the line 33. Other characteristics, such as smudging, jagged edges, tilting, light or dark areas, or voids may also be quickly identified and determined if they are of sufficient value to render the character unacceptable. Moreover, by their relative position on the graph they may be easily located on the character. If the graph indicates that standardized procedures have been followed in making the character and it is then found unsatisfactory, the fault may then be attributable to the printing medium for determination as to its acceptability.

In order to provide an illustration, indicative of the relative size of the section of the character being read by the phototube, there is shown a dotted line K on FIG. 4. The line is slightly shorter than the height of the character and has a width that is only a small percentage of the character width.

It will accordingly be appreciated that there has been disclosed an apparatus which is capable of quickly and easily determining if the quality of a printed character is acceptable or not and from such also determine if the quality of the printing medium is acceptable or not. The apparatus continuously senses only a very small width of the character but substantially all of its height and thus is made extremely precise in being responsive to changes in reflectance caused by the printed quality of the character. Moreover, substantially the whole character is sensed and preferably the reflectance is recorded as a graph from which determination of quality may be easily made.

Variations and modifications may be made within the scope of the invention and portions of the improvements may be used without others.

I claim:
1. An apparatus for determining the quality of a printed character comprising a support for supporting a copy sheet on which the character is formed with the copy sheet having a different reflectance than the character, a magnifying lens, means for moving the support with respect to the lens to have the character pass transversely therebeneath, a light source for illuminating the area of the copy sheet under the lens, a photoresponsive cell having a responsive area, an enclosure containing said cell and having an opening in which the lens is mounted to direct reflected light from the character through the lens to form an image in the enclosure, an opaque screen positioned between the responsive area and the lens, said screen being formed with a slit that is substantially rectilinear in shape to be exceedingly longer in a direction transverse to the direction of movement of the character than in its width and with said slit being positioned between the lens and the responsive area to limit the portion of the image of the character impinging on the area to that which passes through the slit and means for continuously measuring the change in value of the photoresponsive cell in which the slit limits the instantaneous portion of the character reflected on the responsive area to less than 5% of the character's width and substantially all though less than its complete height.

2. The invention as defined in claim 1 in which the image of the character formed by the lens is many times larger than the character and in which the length of said slit is many times the height of the character transverse to its line of movement.

3. The invention as defined in claim 1 in which the last-named means includes a graphic recording means having a stylus transversely positionable according to the value of a signal across a sheet of lengthwise moving paper, means connecting the photoresponsive means to the recording means to have the value of said signal be related to the condition of the photoresponsive means.

References Cited

UNITED STATES PATENTS

| | | | |
|---|---|---|---|
| 2,202,359 | 5/1940 | Tauschek. | |
| 3,229,075 | 1/1966 | Palti | 235—61.11 |
| 3,053,181 | 9/1962 | Jorgensen | 101—426 |
| 3,185,088 | 5/1965 | Norton | 101—426 |

RICHARD B. WILKINSON, Primary Examiner

JOSEPH W. HARTARY, Assistant Examiner